United States Patent
Shang et al.

(10) Patent No.: US 7,151,935 B2
(45) Date of Patent: Dec. 19, 2006

(54) METHOD FOR INITIATIVE SETTING UP CALLS BY SERVICE CONTROL POINT IN MOBILE INTELLIGENT NETWORK

(75) Inventors: Yongping Shang, Shenzhen (CN); Weihua Zheng, Shenzhen (CN); Jianjun Zhang, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 10/485,234

(22) PCT Filed: Mar. 29, 2002

(86) PCT No.: PCT/CN02/00224

§ 371 (c)(1),
(2), (4) Date: Jan. 29, 2004

(87) PCT Pub. No.: WO03/013114

PCT Pub. Date: Feb. 13, 2003

(65) Prior Publication Data

US 2004/0166855 A1    Aug. 26, 2004

(30) Foreign Application Priority Data

Jul. 30, 2001    (CN) .................................. 01 1 24518

(51) Int. Cl.
*H04Q 7/20* (2006.01)
(52) U.S. Cl. ...................................... 455/445; 455/403
(58) Field of Classification Search ................ 455/403, 455/414.2, 445; 379/201.12, 221.08, 221.09
See application file for complete search history.

(56) References Cited

U.S. PATENT DOCUMENTS

| | | | | |
|---|---|---|---|---|
| 5,526,415 A | * | 6/1996 | Wakamoto | ................... 379/230 |
| 5,937,053 A | * | 8/1999 | Lee et al. | .............. 379/221.14 |
| 6,363,424 B1 | * | 3/2002 | Douglas et al. | ............. 709/224 |
| 6,453,028 B1 | * | 9/2002 | Ganesh | ................... 379/112.04 |
| 6,775,367 B1 | * | 8/2004 | Lehtinen | ................ 379/201.12 |
| 2001/0027100 A1 | * | 10/2001 | Immonen et al. | ........... 455/422 |

FOREIGN PATENT DOCUMENTS

| | | |
|---|---|---|
| CN | 1296707 | 5/2001 |
| CN | 1296708 | 5/2001 |
| KR | 2001011742 | 2/2001 |
| KR | 2001011743 | 2/2001 |

* cited by examiner

*Primary Examiner*—Erika A. Gary

(57) ABSTRACT

Disclosed is a method for actively establishing a call by a SCP in a mobile intelligent network. when a Service Control Function (SCF) requests a Service Switching Function (SSF) to create a new call to one call party, the SSF in the intelligent network establishes a call to the called party according to destination address information provided by the SCF, at the same time, SSF configures event detect point requests, monitors responses and occurrence of events, and SCF handles the call. The mobile intelligent network for accomplishing the method comprises: Service Creation Environment (SCE), Service Management System (SMS), SCP, SSP and a plurality of Intelligent Peripherals (IPs). In the invention, the Initiate Call Attempt (ICA) operation is added between SCP and SSP. The ICA operation uses extended protocols for communication so that the processing of actively establishing a call in network side can be realized. With the present invention, the ability of SCP and SSP is improved, and the services such as dunning call and wake-up call can be provided in mobile intelligent network.

10 Claims, 3 Drawing Sheets

METHOD FOR INITIATIVE SETTING UP CALLS BY SERVICE CONTROL POINT IN MOBILE INTELLIGENT NETWORK

FIELD OF THE TECHNOLOGY

The present invention relates to mobile intelligent network technology in telecommunication field, and more particularly to a method for actively establishing calls by a Service Control Point (SCP) in a mobile intelligent network.

BACKGROUND OF THE INVENTION

At present, dunning call service and wake-up call service have been developed in fixed intelligent network, during these operations, the problem needs to be solved most urgently is how to actively establish calls by SCP and then play back a recorded voice announcement for certain subscribers. In prior fixed intelligent network technology, Initiate Call Attempt (ICA) for asking Service Switching Point (SSP), the interface equipment between server switching layer and intelligent layer, to create voice channels to subscribers has been defined through Intelligent Network Application Protocol (INAP), and then recorded voice announcements such as "no enough balance in your account, charge immediately please" can be played back to subscribers via the voice channel.

Nevertheless, these operations having wide usage and high practical value in fixed intelligent network can not be realized in the prior mobile intelligent network, because calls to the subscribers cannot be establish actively with the Customized Application for Mobile Network Enhanced Logic (CAMEL) protocol in mobile intelligent network corresponding to the INAP protocol in fixed intelligent network. In this way, the development of dunning call service and wake-up call service in mobile intelligent network services is limited.

SUMMARY OF THE INVENTION

In order to overcome the shortcomings of the prior art, an object of the invention is to provide a method for actively establishing a call by a SCP in a mobile intelligent network. With this method, the functions of SCP and SSP can be improved so that intelligent services such as dunning call can be provided in the mobile intelligent network.

The method according to the invention is implemented through the following technical schemes.

A method for actively establishing a call by a SCP in a mobile intelligent network, comprising: when a Service Control Function (SCF) requests a Service Switching Function (SSF) to create a new call to one call party, the SSF in the intelligent network establishing a call to the called party according to destination address information provided by the SCF, at the same time, SSF configuring event detect point requests, monitoring responses and occurrence of events, and SCF handling the call. Here, the mobile intelligent network for realizing the method comprises: Service Creation Environment (SCE) used for providing environment requested by client end service in server end, Service Management System (SMS) used for managing users to send services in Service Management Access Point (SMAP), SCP which is the control center for user services in mobile intelligent network, SSP used for providing service interface and switching between user services and SCP, and a plurality of Intelligent Peripherals (IPs).

The method further comprises:

a. when a SCF requests a SSF to create a new call to one call party, SCP activating corresponding service logic and creating operation parameters;

b. SCP sending an Initiate Call Attempt (ICA) operation request to SSP;

c. configuring the Basic Call State Model (BCSM) event between SCP and SSP, and reporting a monitoring event while the event happens; and d. when BCSM event happens, SSP reporting the monitoring event to SCP, SCP implementing corresponding processing according to the type and service characteristic of the event.

In the method, step a further comprises the step of setting destination routing address; step d further comprises: SSP connecting the call to subscriber side according to the destination routing address, and playing back a recorded voice announcement to the subscriber under control of SCP.

The ICA operation is implemented between SCP and SSP, and the service processing is implemented with CAP PHASE2 extended protocol set.

The ICA operation includes the process of invoking entity (gsmSCF) and the process of responding entity (gsmSSF). The process of invoking entity and that of responding entity respectively include normal processing and error processing.

In normal processing, the process of invoking entity at least includes the following preconditions:

1) Service Logic Process Instance (SLPI) has been initiated and no control relationship between SCF and SSF has been established;

2) the SLPI has decided to send ICA operation to the SSF; and

3) Service Control State Machine Finite State Machine (SCSM FSM) is in the idle state.

In normal processing, the process of invoking entity at least includes the following post conditions:

1) the control relationship from SCF to SSF has been established;

2) the SCSM FSM switches to the sate of preparing gsmSSF instructions; and

3) SLPI is carried out continuously.

In error processing, the process of invoking entity comprises: if the $T_{SCF}$ overtimes, the SCF terminating conversation and notifying maintenance function modules of the termination event, then informing the SLPI that conversation establishment has failed, then turning SCSM FSM to the idle state.

In normal processing, the process of responding entity at least includes the following post conditions:

1) a new Originating-Basic Call State Model (O-BCSM) has been established and the call processing is hanged up at detection point 2; and 2) gsmSSF FSM switches from the idle state to the state of waiting for instructions.

In this invention, the ability of control point in the server end is improved with the help of extending CAMEL protocols in mobile intelligent network. BCSM can be created automatically after SSP has received the operation, thereby control relationship can be established between SSP and SCP. In this way, the SSP can establish connection to the subscriber according to the instructions from the SCP, and play back recorded voice announcements to the subscriber. Accordingly, the services such as dunning call and wake-up call can be provided in mobile intelligent network with the present invention.

DETAILED DESCRIPTION OF THE INVENTION

The invention will be described in more detail hereinafter with reference to the accompanying drawing.

Figure 1:
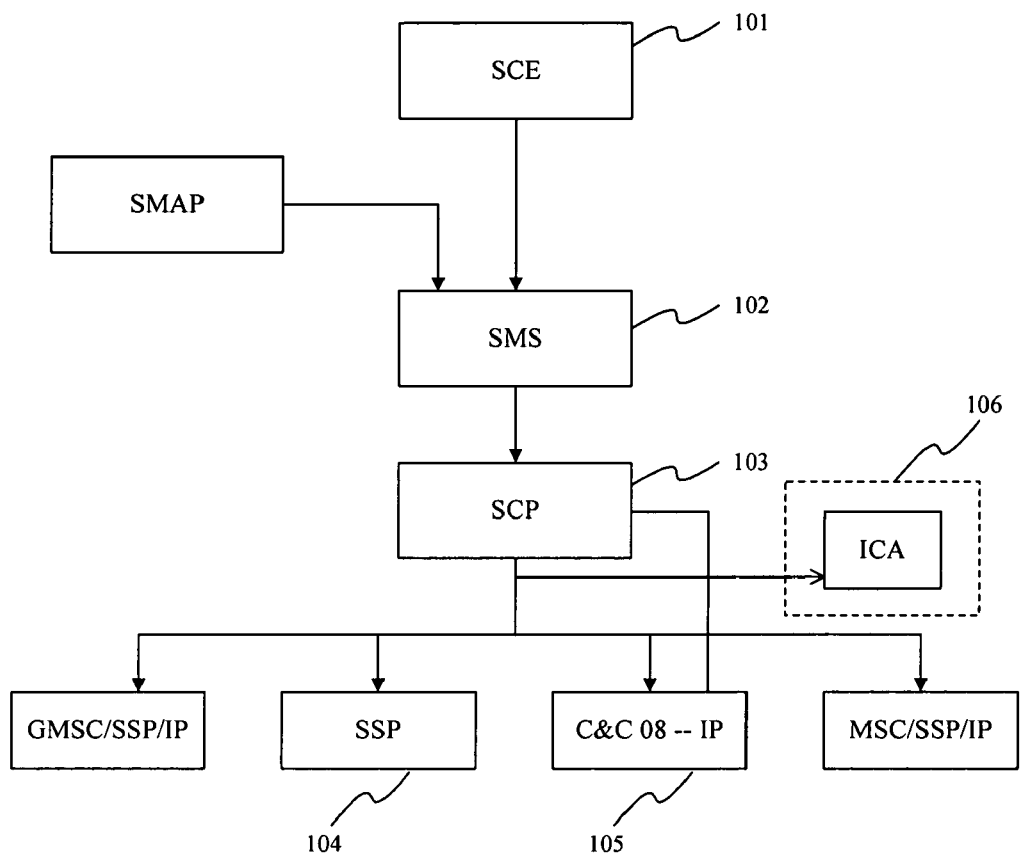
FIG. 1 is a schematic diagram illustrating the system architecture according to the invention.

As shown in FIG. 1, the mobile intelligent network for accomplishing the method for actively establishing a call by SCP according to the invention comprises: Service Creation Environment (SCE) 101 used for providing environment requested by client end service in server end, Service Management System (SMS) 102 used for managing users to send services in Service Management Access Point (SMAP), SCP 103 which is the control center for user services in mobile intelligent network, SSP 104 used for providing service interface and switching between user services and SCP, and a plurality of other Intelligent Peripherals (IPs) 105. In addition, the network further comprises Initiate Call Attempt (ICA) module labeled 106 in FIG. 1. The ICA module located between the SCP and interface devices of intelligent layer is new added in the extended protocol provided by the present invention. Here, the communication protocol between SCP and SSP handles the services with an extended protocol set, i.e., the second phase of the Customized Application for Mobile Network Enhanced Logic Part (CAP PHASE2) extended protocol set. The CAP PHASE2 extended protocol set involves ICA operation process, which is used for realizing the process of actively establishing calls in the network side, and further for providing different services such as dunning call and wake-up call.

Figure 2:
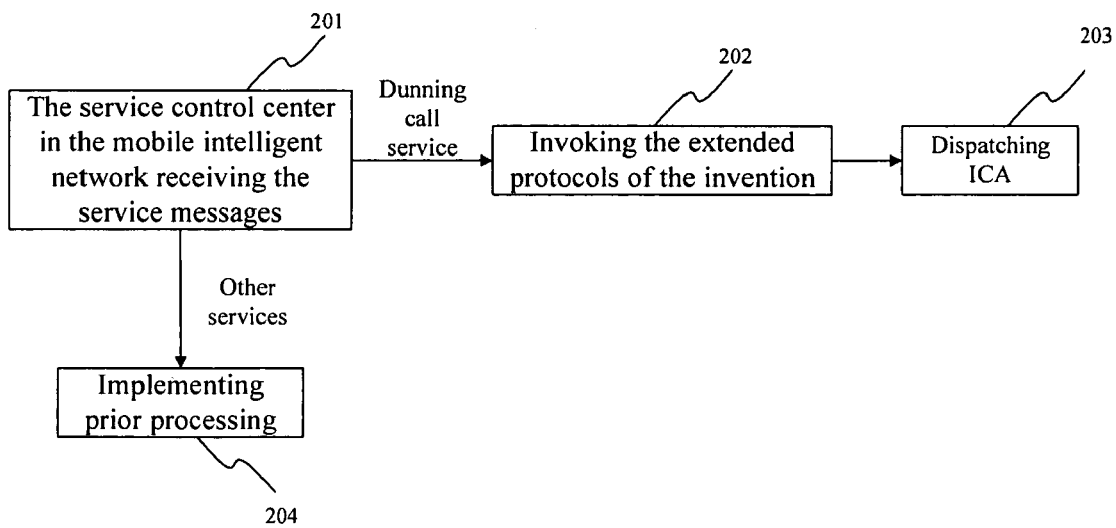
FIG. 2 is a schematic diagram illustrating function modules according to the invention.

FIG. 2 is a schematic diagram illustrating function modules according to the invention. As shown in FIG. 2, after receiving service messages from a subscriber (in module 201), the SSP analyses the messages. For the dunning call service, the SCP invokes the extended protocol function provided in the present invention for asking the SSP to create BCSM (in module 202), and then establishes the call connection to the subscriber and dispatches ICA (in module 203). For other services, the SSP implements prior operations (in module 204).

Figure 3:
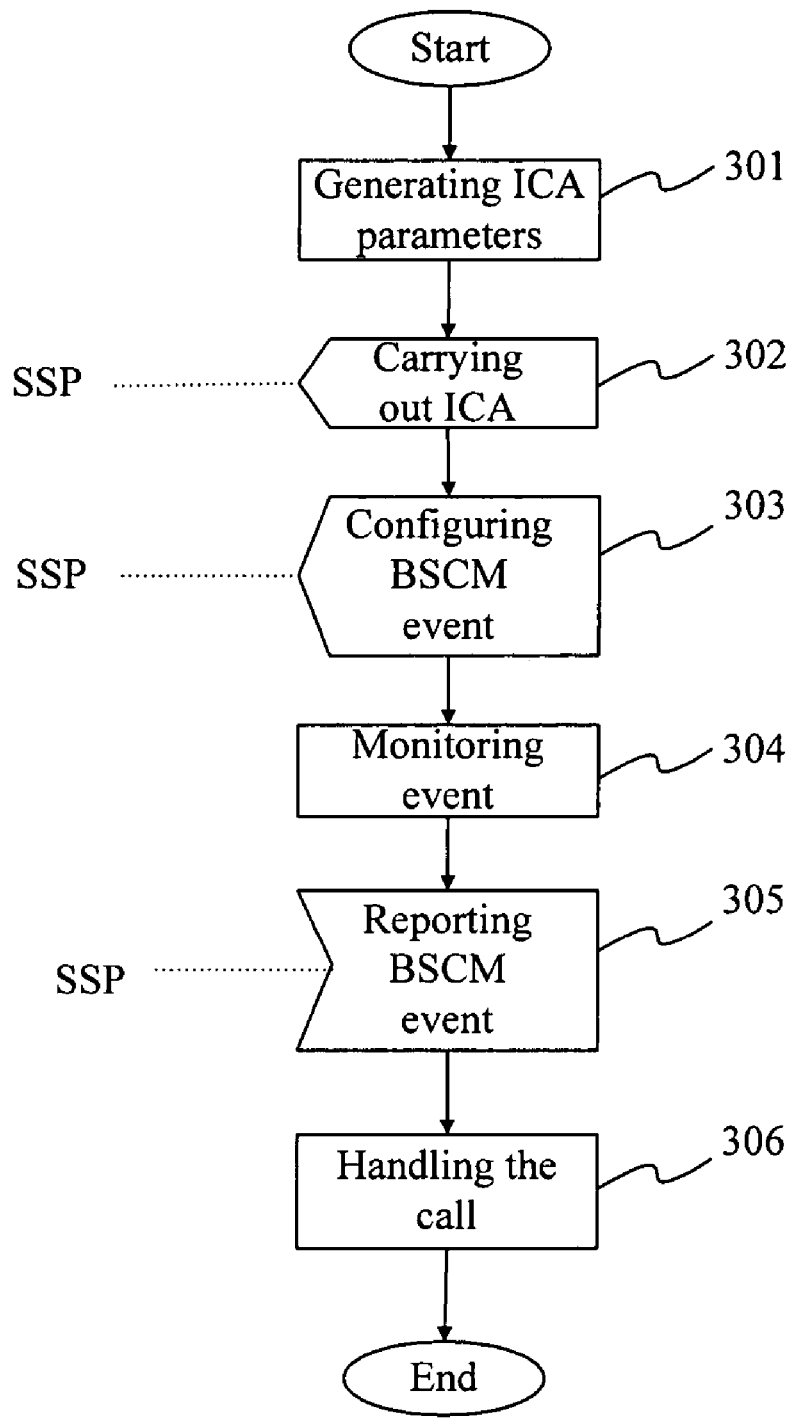
FIG. 3 is a flow diagram illustrating the ICA process according to the invention.

FIG. 3 is a flow diagram illustrating the ICA process according to the present invention. As shown in FIG. 3, first, the SCP decides to initiate services which need the supports from ICA operation, and generates operation parameters (step 301). Secondly, ICA operation is carried out between the SCP and SSP which is the interface of intelligent layer (step 302). In order to establish control relationship between SCP and SSP, it is necessary to configure BCSM event between the SCP and the SSP once again (step 303). Then, the SCP waits for the reporting and monitoring of the event (step 304). When the event happens, the monitoring event will be reported upwards (step 305) in SSP. Then the SCP makes corresponding processing based on the type and service characteristic of the event (step 306). After the step, the working flow is ended. In the above-mentioned ICA operation, a destination routing address is set. The SSP can connect the call to subscriber end according to the destination routing address, and play back a recorded announcement to the subscriber under control of the SCP.

The above-mentioned ICA operation includes the process of invoking entity (gsmSCF) and that of responding entity (gsmSSF). The ICA operation is used to ask the SSF to establish call connection to the called party according to the address information provided by SCF. At the same time, Event Detecting Point-Request (EDP-R) needs to be configured to monitor responses and other events of calling failure so that the SCF can handle the call properly when these events happen.

The process of invoking entity (gsmSCF) includes normal processing and error processing. In normal processing, the preconditions of gsmSCF are:

(1) Service Logic Process Instance (SLPI) has been initiated and no control relationship between SCF and SSF has been established;

(2) the SLPI has decided to send "InitiateCallAttempt" operation to the SSF; and (3) Service Control State Machine Finite State Machine (SCSM FSM) is in the state of "Idle".

The post conditions of gsmSCF are:

(1) the control relationship from SCF to SSF has been established;

(2) the SCSM FSM switches to the sate of "Preparing gsmSSF Instructions"; and (3) SLPI is carried out continuously.

In error processing, if the $T_{SCF}$ overtimes, the SCF will terminate conversation and notify maintenance function modules of the termination event, then inform the SLPI that conversation creation has been failed, then SCSM FSM will be turned to the state of "idle". The CAMEL2 specifications used for error process in other operations and Transaction Capabilities Application Part (TCAP) services for reporting operation errors accord with the rules of GSM 09.78 Version 6.2.1 Release 1997.

The process of responding entity (gsmSSF) in ICA operation also includes normal processing and error process. In normal process, the precondition of gsmSSF is "null" and the post conditions of gsmSSF are:

(1) a new Originating-Basic Call State Model (O-BCSM) has been established and the call process is hanged up at Detection Point 2 (DP2); all other subsequent operations will be carried out in normal way; and (2) gsmSSF FSM switches from the state of "Idle" to that of "Waiting for Instructions".

While the call is created, the network should set a deerror value for the value representing the characteristics and capacity received from the calling party or the relevant parties. If the telephone number of calling party has been provided by SCF, the characteristics will be determined based on this received telephone number of calling party.

Error process, including operation error process and TCAP services for reporting operation errors, accords with the rules of GSM 09.78 Version 6.2.1 Release 1997.

Figure 4:
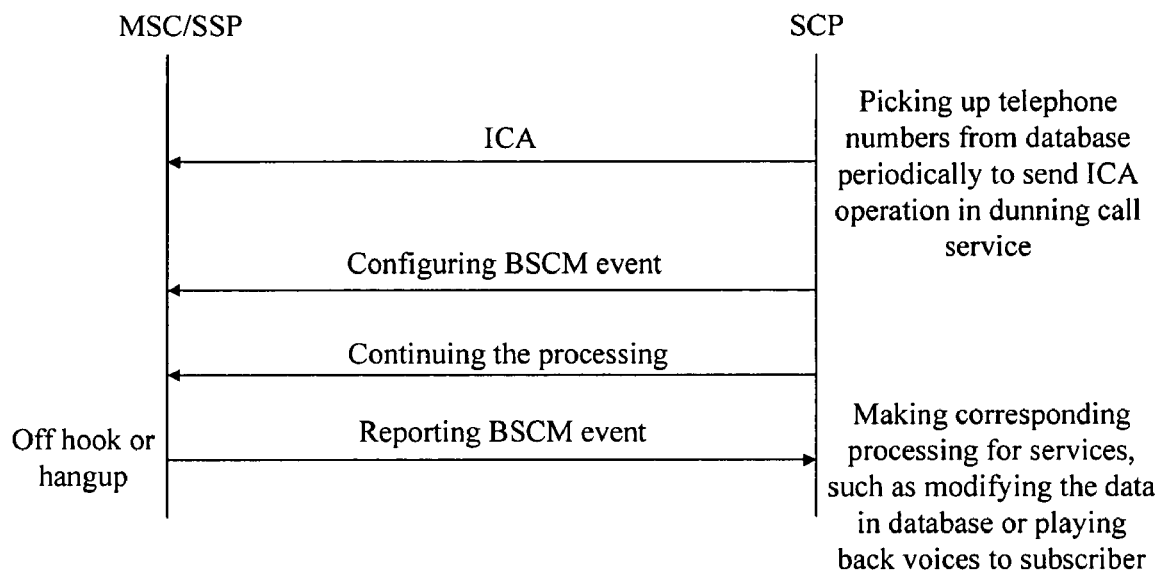
FIG. 4 is a schematic diagram illustrating the processing steps according to an embodiment of the invention.

ICA service processes mainly include: generation of ICA parameters, ICA operation, configuration of BCSM events, monitoring of events, reporting of BCSM events and some other processes handling the call as shown in FIG. 4 which is a schematic diagram illustrating the processing steps according to an embodiment of the invention.

The filtration of activation service and the response operations after filtration in heavy load operations, specially the ICA operations, will be described with reference to FIG. 4. Under the condition of dunning call service, SCP will pick telephone numbers from data base periodically. Once the service is initiated, an ICA request will be sent immediately to the SSP. In order to monitor calls, SCP needs to configure BCSM events for SSP, that means to send information for configuring BCSM events (RequestReportBCSM) to SSP; and then to ask SSP to continue the process, i.e., sends message for continuing the process (Continue). When BCSM events configured by SCP happen, SSP will stop the process and report the events to SCP, i.e., SSP will send BCSM event report information (EventReportBCSM) to SCP. Afterwards, SCP makes further instructions to ask SSP to carry out subsequent processes, such as playing back voice records to subscribers.

The above description is merely the preferred embodiment of the invention, and is not to be construed as limiting protection scopes of the present invention.

The invention claimed is:

1. A method for actively establishing a call by a Service Control Point (SCP) in a mobile intelligent network, comprising the steps of:
   a. the SCP activating corresponding service logic and creating operation parameters when the SCP requests a service switching point (SSP) to create a new call to a subscriber side;
   b. the SCP sending an Initiate Call Attempt (ICA) operation request to the SSP;
   c. configuring a Basic Call State Model (BOSM) event between the SCP and the SSP; and
   d. when the BOSM event happens, the SSP reporting a monitoring event to the SCP, the SCP implementing corresponding processing according to an event type and service characteristic, and the SSP connecting the call to the subscriber side based on processing of the SCP,
   wherein the call is actively established by the SCP in a mobile intelligent network utilizing the Customized Application for Mobile Network Enhanced Logic (CAMEL) protocol.

2. The method according to claim 1, step a further comprising the step of setting destination routing address; wherein in step d, the SSP connects the call to the subscriber side according to the destination routing address; and the method further comprising the step of playing back a recorded voice announcement to the subscriber under control of the SCP.

3. The method according to claim 1, wherein the ICA operation is implemented between the SCP and the SSP, and the service processing is implemented with a CAP PHASE2 extended protocol set.

4. The method according to claim 3, wherein the ICA operation includes the process of invoking entity (gsmSCF) and the process of responding entity (gsmSSF).

5. The method according to claim 4, wherein the process of invoking entity includes normal processing and error processing.

6. The method according to claim 5, wherein in normal processing, the process of invoking entity at least includes the following preconditions:
   1) a Service Logic Process Instance (SLPI) has been initiated and no control relationship between SCF and SSF has been established;
   2) the SLPI has decided to send an ICA operation to the SSF; and
   3) a Service Control State Machine Finite State Machine (SCSM FSM) is in an idle state.

7. The method according to claim 5, wherein in normal processing, the process of invoking entity at least includes the following post conditions:
   1) control relationship from SCF to SSF has been established;
   2) a SCSM FSM switches to the state of preparing gsmSSF instructions; and
   3) a SLPI is carried out continuously.

8. The method according to claim 5, wherein the error processing comprises: if a TSCF overtimes, the SCF terminating conversation and notifying maintenance function modules of a termination event, then informing a SLPI that conversation establishment has failed, then turning a SCSM FSM to an idle state.

9. The method according to claim 4, wherein the process of responding entity includes normal processing and error processing.

10. The method according to claim 9, wherein in normal processing, the process of responding entity at least includes the following post conditions:
   1) a new Originating-Basic Call State Model (O-BCSM) has been established and the call processing is hanged up at detection point 2; and
   2) a gsmSSF FSM switches from an idle state to a state of waiting for instructions.

* * * * *